United States Patent [19]
Yagi et al.

[11] Patent Number: 5,896,032
[45] Date of Patent: Apr. 20, 1999

[54] POSITION DETECTION DEVICE POSITIONING DEVICE AND MOVING MEDIUM-TYPE MEMORY DEVICE

[75] Inventors: Takaaki Yagi; Mitsuchika Saito, both of Kawasaki, Japan

[73] Assignee: Hewlett-Packard Company, Palo Alto, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/661,676

[22] Filed: Jun. 11, 1996

[30] Foreign Application Priority Data

Jun. 12, 1995 [JP] Japan ..................... 7-169225

[51] Int. Cl.$^6$ ............... G01B 7/00; G01D 5/241; G01R 27/26; G01G 5/14
[52] U.S. Cl. ............. 324/660; 324/686; 324/76.71; 361/292
[58] Field of Search ................. 324/660, 679, 324/683, 686, 76.71; 340/870.37; 361/280, 292, 296, 300

[56] References Cited

U.S. PATENT DOCUMENTS

| | | | |
|---|---|---|---|
| 3,348,133 | 10/1967 | Wolfendale | 324/660 |
| 4,350,981 | 9/1982 | Tanaka et al. | 324/660 |
| 4,523,195 | 6/1985 | Tanaka et al. | 340/870.37 |
| 4,566,193 | 1/1986 | Hackleman et al. | 33/1 D |
| 4,879,508 | 11/1989 | Andermo | 324/690 |
| 4,893,071 | 1/1990 | Miller | 324/660 |
| 5,023,559 | 6/1991 | Andermo | 324/662 |
| 5,053,715 | 10/1991 | Andermo | 324/662 |
| 5,708,367 | 1/1998 | Tousson | 324/660 |
| 5,731,707 | 3/1998 | Andermo | 324/660 |

FOREIGN PATENT DOCUMENTS

| | | | |
|---|---|---|---|
| 0 304 893 | 3/1989 | European Pat. Off. | G01D 5/244 |
| - 407 020 A1 | 1/1991 | European Pat. Off. | G01D 5/24 |
| 0 586 023 A2 | 3/1994 | European Pat. Off. | G01D 5/24 |
| 60-4801 | 1/1985 | Japan | G01B 7/00 |
| 62-235503 | 10/1987 | Japan | 324/660 |
| 2 139 359 | 11/1984 | United Kingdom | G01B 7/30 |

OTHER PUBLICATIONS

Dobson et al., "Position Encoder," IBM Technical Disclosure Bulletin, vol. 21, No. 1, Jun. 1978, pp. 242–243, Jun. 1978.

*Primary Examiner*—Glenn W. Brown
*Attorney, Agent, or Firm*—Ian Hardcastle

[57] ABSTRACT

A small position detection and positioning device detects relative displacement between two members with high precision. A moving medium-type memory device using such positioning device is also provided. The position detection device includes a linear array of first electrodes at equal pitches on one of the two members that have relative displacement in at least one dimension, and a linear array of at least one second electrode on the other member. The first electrodes are positioned opposite the second electrodes and separated from them by a minute gap. The first electrodes are divided into a first electrode set composed of alternate ones of the first electrodes, and a second electrode set composed of alternate ones of the first electrodes not in the first electrode set. A signal source which applies a first alternating signal to the first electrode set and a second alternating signal that differs in phase by 180° from the first alternating signal to the second electrode set is connected to the first electrodes. A current detecting device that measures the current flowing in the at least one second electrode is connected to the at least one second electrode.

16 Claims, 6 Drawing Sheets

POSITION DETECTION DEVICE POSITIONING DEVICE AND MOVING MEDIUM-TYPE MEMORY DEVICE

BACKGROUND OF THE INVENTION

1. Technical Field

The invention relates to a position detection and positioning device that is capable of detecting and controlling very small relative displacements between two members. More particularly, the invention relates to a moving medium-type memory device that contains a controller that includes such a position detection and positioning device.

2. Description of the Prior Art

It is known to use an optical interferometer-type device or a variable capacitance-type device to detect and control very small relative displacements between two members. In the optical interferometer-type device, the range of movement can be large (for example, 1 cm or more), and the positioning accuracy can be relatively high (5 to 10 nm in a heterodyne interferometer). However, such devices require a light source, such as an He-Ne gas laser, to generate two slightly different frequencies of light, and an optical system to make these two light frequencies interfere. Accordingly, an optical interferometer-type device is large and cannot be used in the x-y stage positioning device installed on, for example, a moving medium-type memory chip.

In the variable capacitance-type device, electrodes are formed on each of the two members. Changes in the capacitance that accompany a change in the distance between the electrodes formed on one member and the electrodes formed on another member are measured, such that a very small relative displacement between the two members can be measured. In this device, as the size of the device decreases, the positioning accuracy decreases (in other words, the equipment must be made larger to increase the positioning accuracy).

An x-y stage positioning device, for example as may be installed in a moving medium-type memory chip, demands a positioning accuracy of several tens of nanometers in a range of movement of 1 mm. Increasing the size of a conventional variable capacitance-type device to improve its positioning accuracy makes such a device unsuitable for use in an x-y stage positioning device.

It would be advantageous to provide a small position detection device, especially a position detection device that can detect the relative displacement between two members with high accuracy. It would additionally be advantageous to provide a moving medium-type memory device that uses such a positioning device.

SUMMARY OF THE INVENTION

The invention provides a small position detection device that can detect the relative displacement between two members in at least one dimension with high accuracy. The invention also provides a positioning device that incorporates the position detection device according to the invention. Finally, the invention provides a moving medium-type memory device that incorporates the positioning device according to the invention.

In the position detection device, a linear array of first electrodes is formed on one of the two members (from now on to be referred to as the first member), and a linear array of at least one second electrode is formed on the other of the two members (from now on to be referred to as the second member).

For purposes of the discussion in this disclosure, when only one second electrode is formed on the second member, this single second electrode is referred to as an array.

When three or more first electrodes are formed on the first member, they preferably have equal pitches. Also, when three or more second electrodes are formed on the second member, they preferably have equal pitches. The pitch of the first electrodes and the pitch of the second electrodes can be equal to each other, but preferably differ from each other. If the pitch of the first electrodes and the pitch of the second electrodes differ, a vernier can be constructed from the array of first electrodes and the array of second electrodes.

The first electrodes are positioned opposite the second electrodes separated from the second electrodes by a minute gap. The first electrodes are divided into two electrode sets. A first electode set is composed of alternate ones of the first electrodes and a second electrode set is composed of alternate ones of the first electrodes not in the first electrode set.

A signal source which applies a first alternating signal to the first set of first electrodes and applies a second alternating signal that differs in phase by 180° from the first alternating signal to the other set is connected to the first electrodes via signal lines. Voltages whose phases differ by 180° appear on the signal lines, which decreases or eliminates electromagnetic interference. Moreover, the alternating signal current flowing in the signal lines creates very little interference with peripheral circuits when there are many first electrodes and second electrodes because currents whose phases differ by 180° flow in both of the signal lines, and they therefore tend to cancel each other.

A current measuring device for measuring the current that flows in the second electrodes is connected to the second electrodes. If the magnitude of the current flowing in the second electrodes is small and noise is apparent when the current is measured by the current measuring device, the current measurement can be performed synchronously with the phase of the voltage source.

The first electrodes and second electrodes can have a variety of shapes. Usually, the first electrodes and the second electrodes have long, narrow shapes when many electrodes are formed on both the first and the second members, i.e., the array of first electrodes and the array of second electrodes are comb shaped. When the first electrodes and second electrodes have long narrow shapes, the array of first electrodes and the array of second electrodes are positioned relative to one another so that the electrodes do not cross, i.e., so that the electrodes are parallel to one another.

In the simplest example, a linear array of two first electrodes are formed on the first member and a linear array of one second electrode is formed on the second member. A current flows in the second electrode as a result of capacitance between each of the two first electrodes and the second electrode. Since voltages whose phases differ by 180° appear at the two first electrodes, the magnitude of the current flowing through the second electrode depends on the relative distance between the second electrode and each of the first electrodes. The current in the second electrode can be measured by the current measuring device, and from this measurement the specific relative positions of the first member and second member can be determined.

For example, when a null current flowing through a second electrode (including cases where the current is essentially zero) is detected, this indicates that the second electrode is located midway between the two first electrodes. Because the position detection device according to the invention detects the relative movement between the two members by identifying the second electrode in which there is no current flowing (i.e., the current is zero), a null current electrode detector can be used. The null current electrode detector can be constructed to include a current-to-voltage (I/V) converter for each second electrode, to detect the difference in voltage between outputs of the respective I/V converters of the second electrodes, and from this to identify the second electrode in which the current is zero.

If there is relative displacement between the first member and the second member when three or more first electrodes are formed on the first member and one second electrode is formed on the second member, the current flowing in the second electrode repetitively decreases to zero as the relative position between the two members progressively changes. In this case, the current measuring device is used and the number of times the current flowing through the second electrode becomes zero is stored to determine the relative displacement between the two members over a large range of movement.

When two first electrodes are formed on the first member and many second electrodes are formed on the second member, the one of the second electrodes in which the current decreases to zero progressively changes as the relative position between the two members progressively changes. By identifying such second electrode, the relative displacement between the two members can be determined over a large range of movement.

In the invention, many first electrodes and many second electrodes can be formed on first members and second members, respectively. In this case, the pitch of the first electrodes and the pitch of the second electrodes can be selected so that the first electrodes and the second electrodes constitute a vernier. This way, a highly accurate position detection device can be provided.

When the first member and second member have relative displacements in two dimensions, motion in two directions must be detected. In this case, the array of the first electrodes is divided into first and second arrays of the first electrodes and the array of the second electrodes is divided into first and second arrays of the second electrodes. The first arrays are positioned at an angle to the second arrays so that relative motion between the two members can be detected in both dimensions.

The electrodes preferably have elongate shapes. The first arrays and the second arrays are positioned in directions such that they intersect one another. The two intersecting directions are referred to as the x- and y-direction. When the two members have relative displacement in either the x-direction or the y-direction, one array of the first electrodes moves lengthways relative to the respective array of the second electrodes. The other array of first electrodes moves relative to the respective other array of second electrodes in the lengthwise direction of the electrodes themselves. Therefore, the lengths of the first electrodes and second electrodes should preferably take into consideration the maximum relative displacement distance in the x- or y-direction of the two members.

The above-described position detection device according to the invention may be incorporated into a positioning device according to the invention. In the positioning device, the two members are given relative displacements by an actuator. An actuator control receives feedback of the detection result generated by the position detection device. When the two members have relative displacements in two dimensions, an x-direction actuator and a y-direction actuator are used. The actuator may use, for example, piezoelectric force or electrostatic force.

The positioning device according to the invention may be incorporated into a moving medium-type memory device according to the invention. The moving medium-type memory device is installed on a support substrate and has a read/write probe that includes a micro-needle at its tip, and a memory medium from which data are read and on which data are written by the micro-needle. In this embodiment of the invention, the members that are stationary with respect to the memory medium and the support substrate correspond to the first member and second member, and the memory medium is moved by the actuator.

BRIEF DESCRIPTION OF THE DRAWINGS

FIG. 1(A) shows an embodiment of the position detection device according to the invention.

FIG. 1 (B) shows the relationship between current that flows in the second electrode and movement of the second electrode relative to the first electrode.

FIGS. 3(1) to 3(8) show the current output of the second electrodes for the position detection device shown in FIG. 2.

DETAILED DESCRIPTION OF THE INVENTION

The mechanisms and circuits in the position detection device, positioning device, and moving medium-type memory device described below can be constructed by using micromachining technology and monolithic silicon layering technology.

Figure 1:
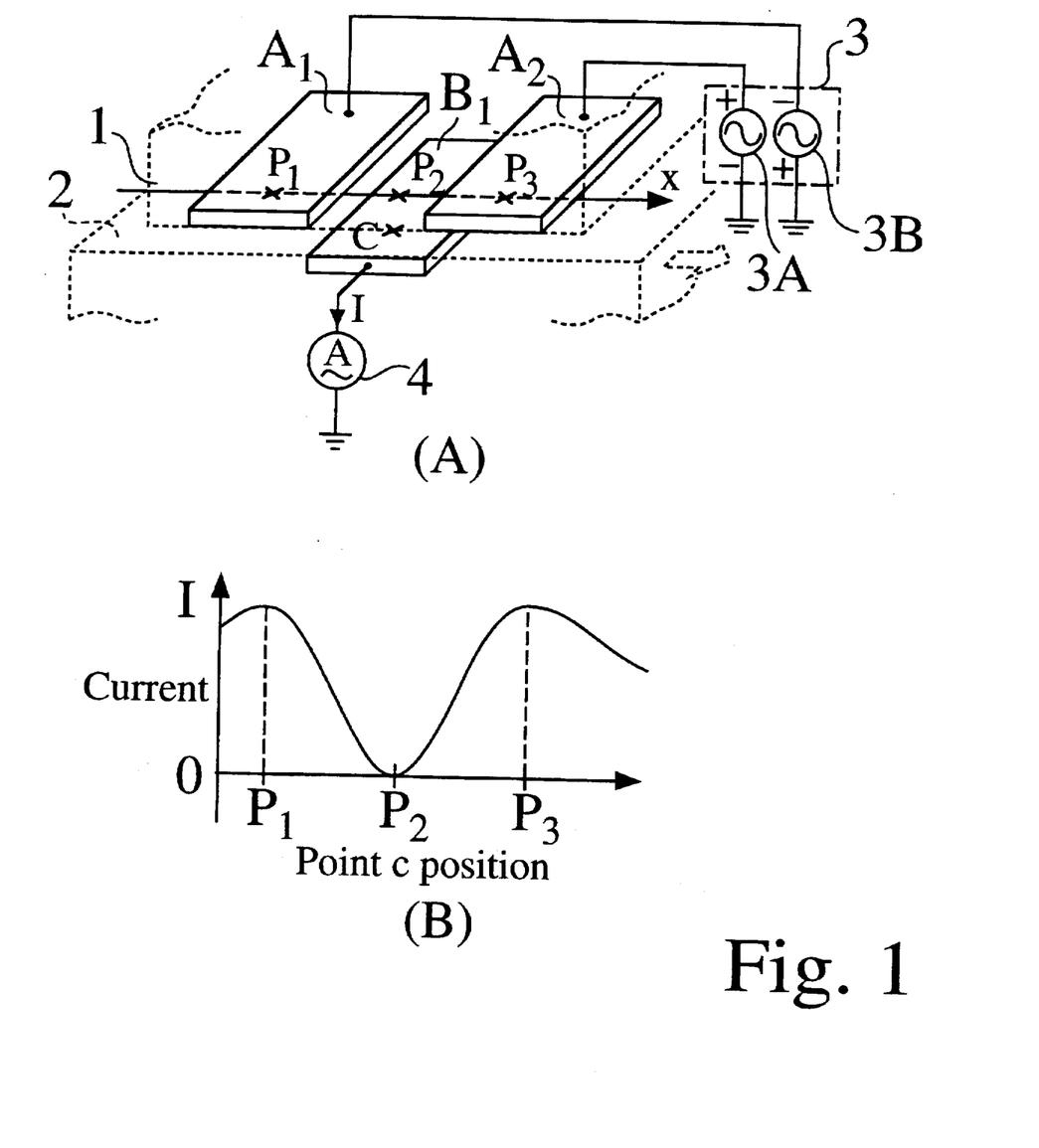

FIG. 1(A) shows one embodiment of a position detection device in accordance with the invention. In this figure, the first member 1 is stationary and the second member 2 can be displaced in the direction of the x-axis. This direction of motion is indicated by the dashed arrow. The first electrodes $A_1$ and $A_2$ are linearly arrayed in the x-direction on the first member 1. The second electrode $B_1$ is formed in the second member 2 opposite the first electrodes $A_1$ and $A_2$ and is separated from the first electrodes by a minute gap.

The signal source 3 for applying alternating voltage signals whose phases differ by 180° across the second electrode $B_1$ is connected to the first electrodes $A_1$, $A_2$. The signal source 3 is formed from the AC signal sources 3A and 3B. The current measuring device 4 (a current meter is shown in FIG. 1(A) as an example of the current measuring device) is connected to the second electrode $B_1$.

When AC voltages are applied between the first electrodes $A_1$, $A_2$ and ground, an AC current flows in the second electrode $B_1$ as a result of capacitance between the electrodes $A_1$ and $B_1$ and between the electrodes $A_2$ and $B_1$.

FIG. 1(B) shows the relationship between the current indicated by the current measuring device 4 and the position of point c on the second electrode $B_1$ relative to the first electrodes $A_1$ and $A_2$. In this figure, points $P_1$ and $P_3$ on the x-axis are the midpoints in the widths of the first electrodes $A_1$ and $A_2$. Similarly, point $P_2$ on the x-axis corresponds to a point midway between the first electrode $A_1$ and the first electrode $A_2$ (i.e., the midpoint between points $P_1$ and $P_3$). Point c is the midpoint of the width of the second electrode $B_1$.

The magnitude I of the current measured by the current measuring device 4 reaches a maximum when the second electrode $B_1$ overlays the first electrode $A_1$ (i.e., when point c is positioned at point $P_1$) and falls to a minimum when the second electrode $B_1$ is positioned midway between the first electrode $A_1$, and the first electrode $A_2$ (i.e., when point c is positioned at point $P_2$). Consequently, the specific relative position between the first member and second member corresponding to the second electrode $B_1$ being located midway between the first electrodes $A_1$ and $A_2$ can be detected when the current indicated by the current measuring device 4 becomes zero.

Figure 2:
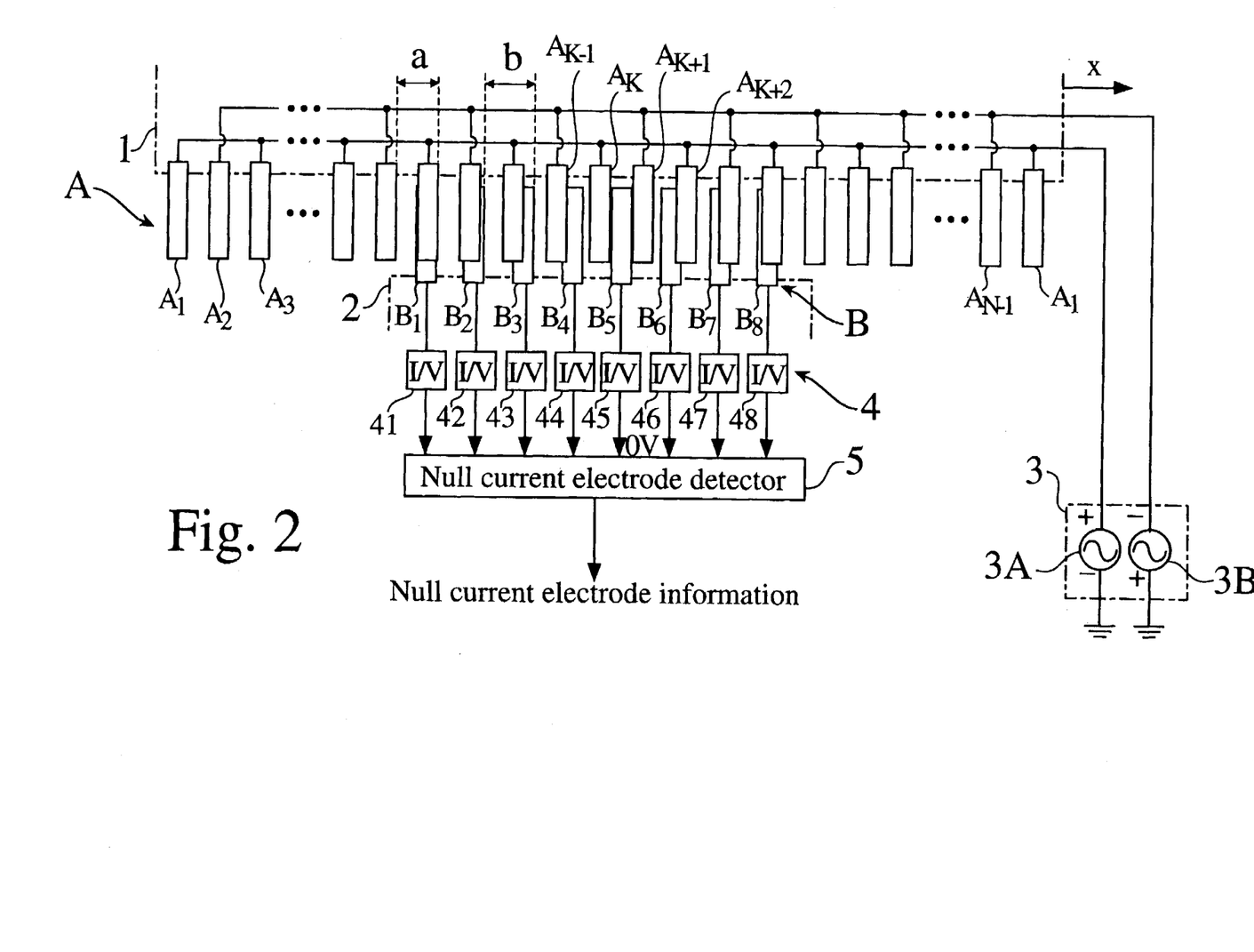
FIG. 2 shows another embodiment of the position detection device according to the invention.

FIG. 2 shows another embodiment of the position detection device in accordance with the invention. In this figure, plural first electrodes $A_1$ to $A_N$ are disposed on the first member 1 in the linear array A. The second electrodes $B_1$ to $B_8$ are disposed on the second member 2 in the linear array B. In this embodiment of the invention, the ratio a/b of the pitch a of the first electrodes $A_1$ to $A_N$ to the pitch b of the second electrodes $B_1$ to $B_N$ is 8/9, although other pitches may be used in alternative embodiments of the invention.

The signal source 3, comprising the AC signal sources 3A and 3B, is similar to that of FIG. 1(A). The signal source is connected to the first electrodes $A_1$ and $A_N$. The array A of first electrodes is divided into a first set composed of alternate ones $A_1, A_3, \ldots$ of the first electrodes and a second set composed of alternate ones $A_2, A_4, \ldots$ of the first electrodes that are not in the first set. The signal source 3 applies a first alternating signal to the first set and a second alternating signal whose phase differs by 180° from the first alternating signal to the second set.

The current measuring device 4 in FIG. 2 is composed of the current/voltage (I/V) converters 41 to 48 that are connected to the second electrodes $B_1$ to $B_8$, respectively. The outputs of the I/V converters are connected to the null current electrode detector 5. Based on the outputs of the I/V converters 41 to 48, the null current electrode detector 5 identifies the one of the second electrodes in which there is no current flowing, and outputs null current electrode information (for example, as a 3 bit code). In the example shown in FIG. 2, the second electrode that has no current flowing is the second electrode $B_5$ to which the I/V converter 45 is connected. The I/V converter 45 is indicated in the figure as generating an output of 0 Volts.

FIGS. 3(1) to 3(8) show the relationship between the positions of the second electrodes $B_1$ to $B_8$ relative to the first electrodes $A_1$ to $A_N$, and the magnitude of the current I indicated by the current measuring device 4, as indicated by the outputs of the I/V converters 41 to 48. The magnitude of the current flowing through each second electrode in the positional relationship shown in FIG. 2 is indicated by the intersections with the dotted line.

Figure 3:
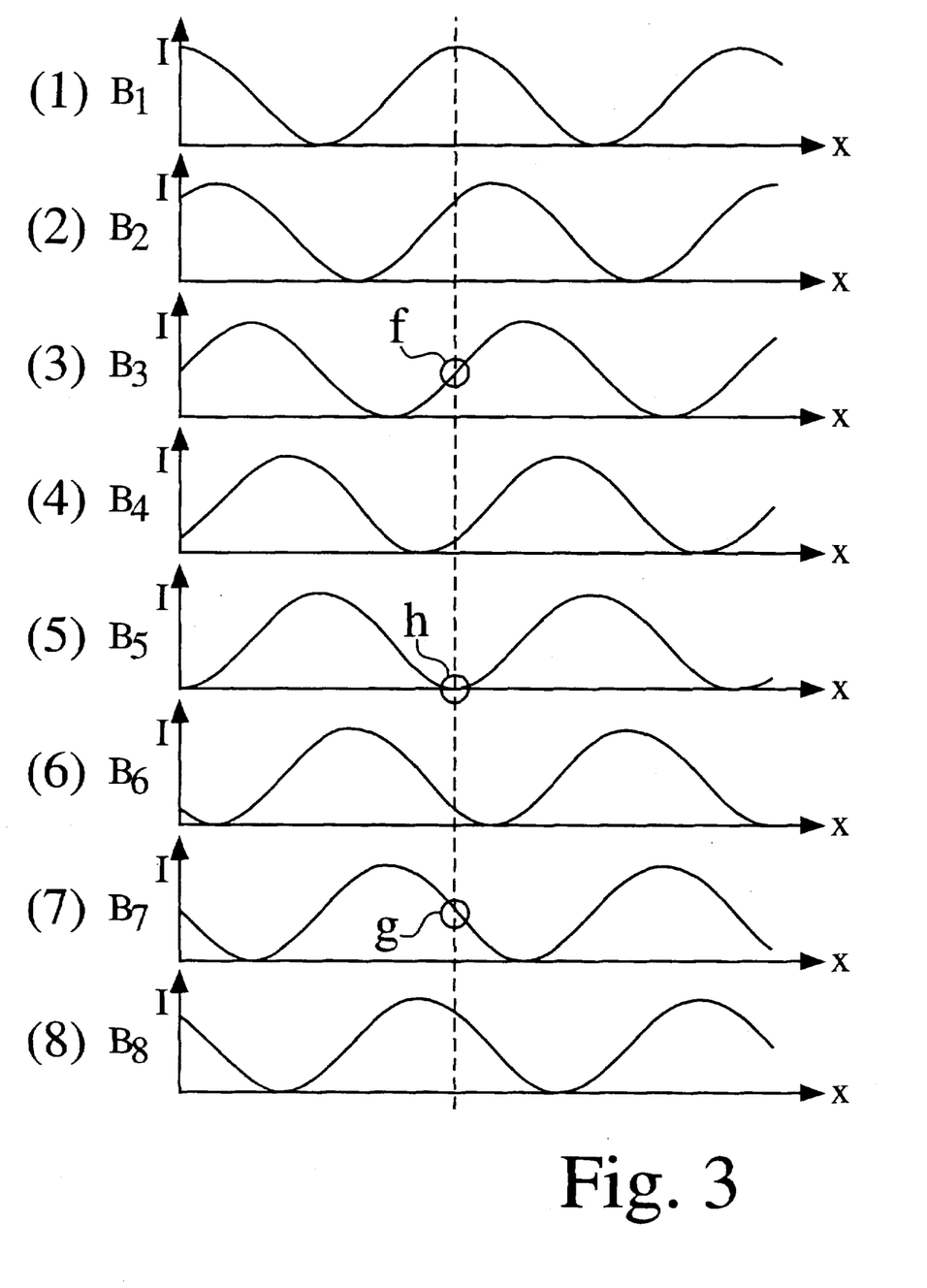

In FIG. 2, the second electrode $B_5$ is shown positioned midway between the two neighboring first electrodes $A_k$ and $A_{k+1}$. Consequently, the current that flows through the second electrode $B_5$ in FIG. 3 is zero. When the first member is displaced a/8 to the right from the positional relationship shown in FIG. 2 (+x-direction) relative to the second member, the second electrode $B_4$ becomes positioned midway between the first electrodes $A_{k-1}$ and $A_k$, and the output of I/V converter 44 falls to zero volts. When the first member is displaced a/8 to the left (−x-direction) from the positional relationship shown in FIG. 2, the second electrode $B_6$ becomes positioned midway between the first electrodes $A_{k+1}$ and $A_{k+2}$, and the output of the I/V converter 46 falls to zero volts. In this way, by successively detecting the one of the second electrodes at which the current becomes zero, the magnitude and the direction of a relative displacement between first member 1 and second member 2 from an initial position can be determined.

The above description ignores the mutual interaction between a second electrode and the first electrodes from which it is separated more than the distance a. However, each second electrode is always located between a pair of neighboring first electrodes. Because voltages whose phases differ by 180° appear at the pair of first electrodes that are disposed on opposite sides of the second electrode, their effects offset each other. When symmetry is considered, position detection is desired in the range in which the second electrode $B_1$ in the position detection device of FIG. 2 is not positioned to the left of the first electrode $A_1$, or the second electrode $B_8$ is not positioned to the right of the first electrode $A_N$.

To identify the one of the second electrodes $B_1$–$B_8$ in which the current is zero, i.e., to identify the one of the I/V converters 41–48 whose output is zero volts, the following procedure is used.

Equal currents flow in the two second electrodes that are symmetrically disposed about the one of the second electrodes that is positioned midway between adjacent first electrodes and in which the current is zero. For example, when the current flowing in second electrode $B_5$ is zero, the same magnitude of current flows in second electrode pairs of $B_4$ and $B_6$, $B_3$ and $B_7$, and $B_2$ and $B_8$ disposed symmetrically about the second electrode $B_5$. This is indicated by the intersections between the curves and the dashed line in FIG. 3.

For reference, the current values in second electrodes $B_3$ and $B_7$ are indicated by f and g respectively, and the current value in second electrode $B_5$ is indicated by h. The null current electrode detector operates by detecting the pairs of second electrodes that have equal currents flowing in them, i.e., it detects the outputs of the I/V converters 41 to 48 that have equal voltages on them. This way, the one of the second electrodes in which the current is zero can be identified. When identifying the two second electrodes that are in symmetrical positions, $B_8$ and $B_1$ are considered to be consecutive in the series $B_1, B_2, \ldots, B_8, B_1, B_2, \ldots$ For example, the pairs of second electrodes having symmetrical positions relative to the second electrode $B_1$ are the pair $B_8$ and $B_2$, the pair $B_7$ and $B_3$, and the pair $B_6$ and $B_4$. Moreover, by measuring whether the current flowing through the second electrodes is either increasing or decreasing, the direction of the displacement can be determined. A circuit for making this determination can be included in the null current electrode detector 5.

Figure 4:
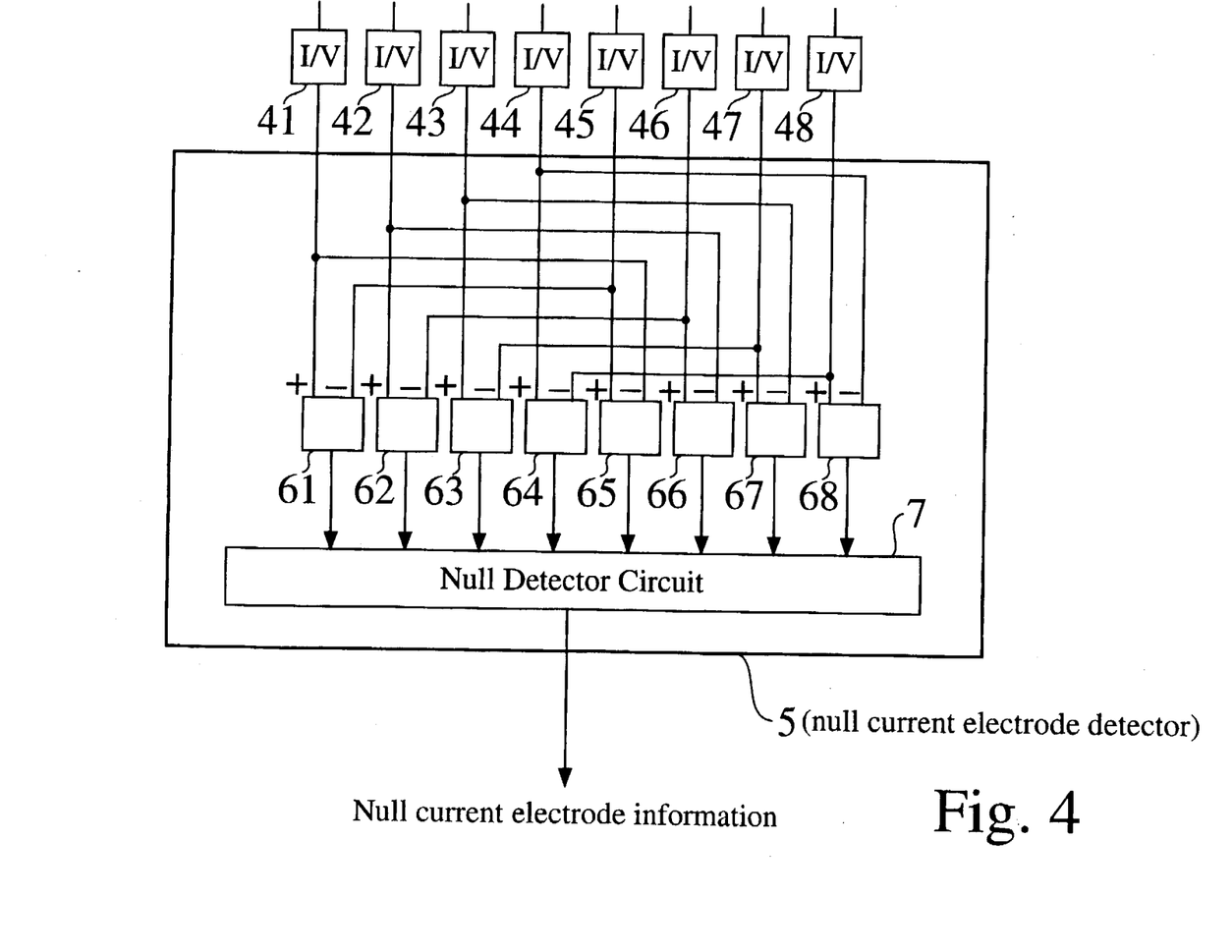
FIG. 4 shows an example of the null current electrode detector for the position detection device shown in FIG. 2.

FIG. 4 shows an example of the null current electrode detector 5 shown in FIG. 2. The null current electrode detector 5 in FIG. 4 consists of eight comparators 61 to 68 and a null detector circuit 7. Second electrodes $B_1$ to $B_8$ are connected to one input pin (+) and second electrodes $B_5$ to $B_8$, and $B_1$ to $B_4$ are connected to the other input pin (−) of the comparators 61 to 68, respectively. The output of each comparator is connected to the null detector circuit 7.

The outputs of current comparators 61 to 68 are connected to the null detector circuit 7. The null detector detects the two comparators that generate an output of zero volts, indicating that the inputs to the comparator are equal. The second electrodes that are connected to these two comparators can then be found. The second electrode symmetrically positioned between the two second electrodes can then be identified. The null detector circuit 7 can output information identifying this second electrode, for example as a 3-bit code.

An embodiment of the positioning device according to the invention will be described next.

Figure 5:
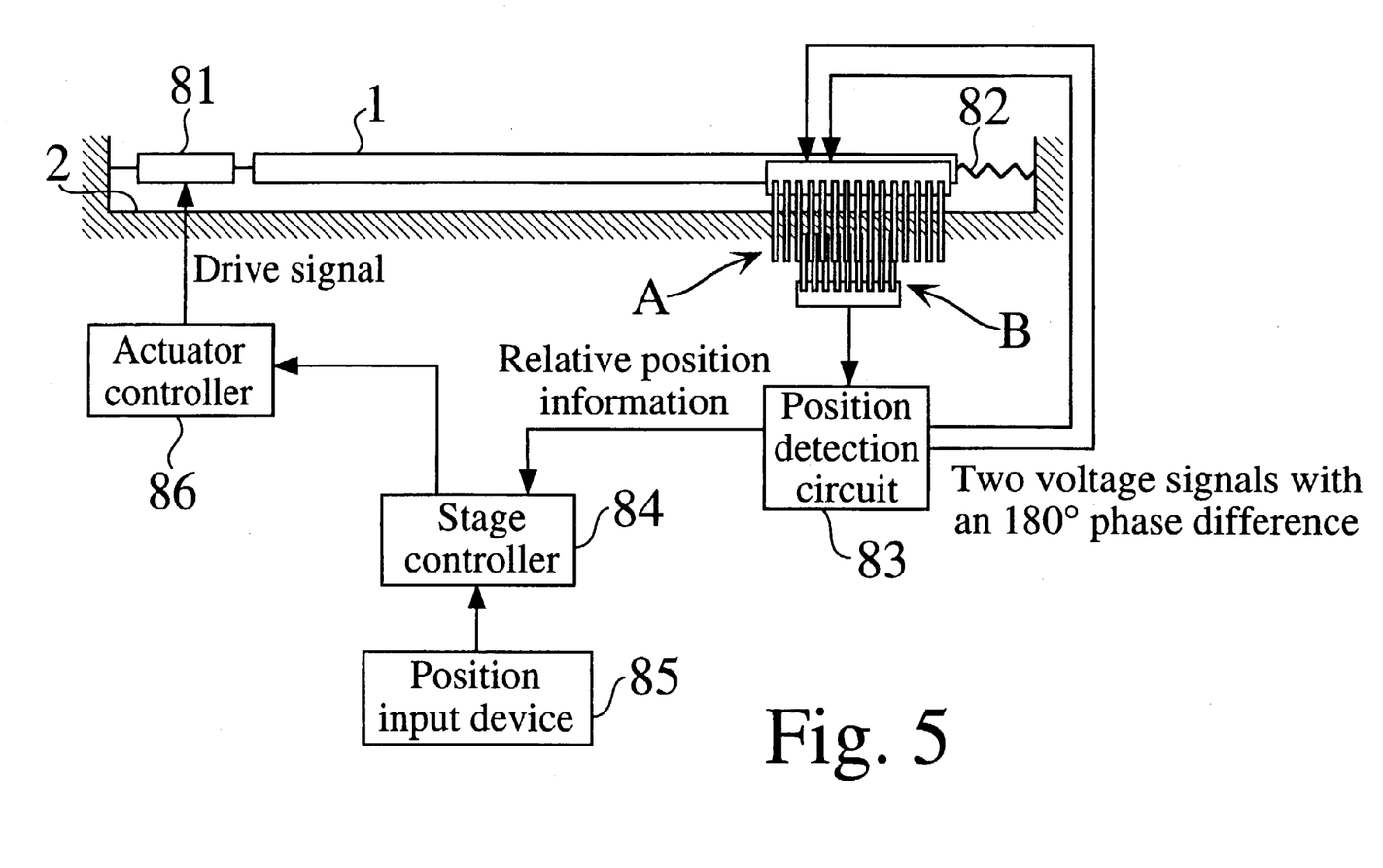
FIG. 5 shows an embodiment of the invention that provides a positioning device that controls one-dimensional displacement.

FIG. 5 shows a one-dimensional positioning device. The first member 1 (the mobile stage in FIG. 5) is positioned on the second member 2 (the substrate in FIG. 5), and can be moved in one dimension parallel to the surface of the second member 2 by the actuator 81. A corrugated leaf spring 82 is installed on the side of the first member 1 opposite the location of the actuator 81.

The linear array A of first electrodes is located on the first member 1 and the linear array B of second electrodes is located on the second member 2. The position detection circuit 83 is also located on the second member 2. Although the position detection circuit 83 is not shown in greater detail, the current measuring device shown in FIG. 2, composed of the null current electrode detector 4, and the signal source 3, are used. The signal source in the position detection circuit 83 is similar to the signal source 3 described above. Two alternating voltage signals whose phases differ by 180° pass through the spring 82 and are applied to alternate ones of the first electrodes, i.e., to every other first electrode. This arrangement reduces or eliminates any electromagnetic interference between the first electrodes and peripheral circuits.

The position detection circuit 83 outputs information indicating the relative displacement between the first and second members. Information on the magnitude and the direction of the displacement is included in the position information. The stage controller 84 receives the position information from the position detection circuit 83 and receives a position input setting from the position input device 85, and supplies a control signal to the actuator controller 86. The controller 86 applies drive signals corresponding to the control signal to the actuator 81.

In a practical example of this embodiment, the pitch of the first electrodes is about 3.00 μm and the pitch of the second electrodes is about 3.03 μm. That is, in a width of about 303 μm, there are 101 first electrodes and 100 second electrodes. This arrangement gives a measurement precision of about 30 nm. In this embodiment, the null current electrode detector in the position detection circuit 83 compares the currents in two second electrodes that are 50 electrodes apart to identify the two second electrodes in which the currents are equal. The null current electrode detector then identifies the second electrode located midway between the two second electrodes in which the currents are equal as the second electrode in which the current is zero.

Another embodiment of the positioning device according to the invention will be described next.

Figure 6:
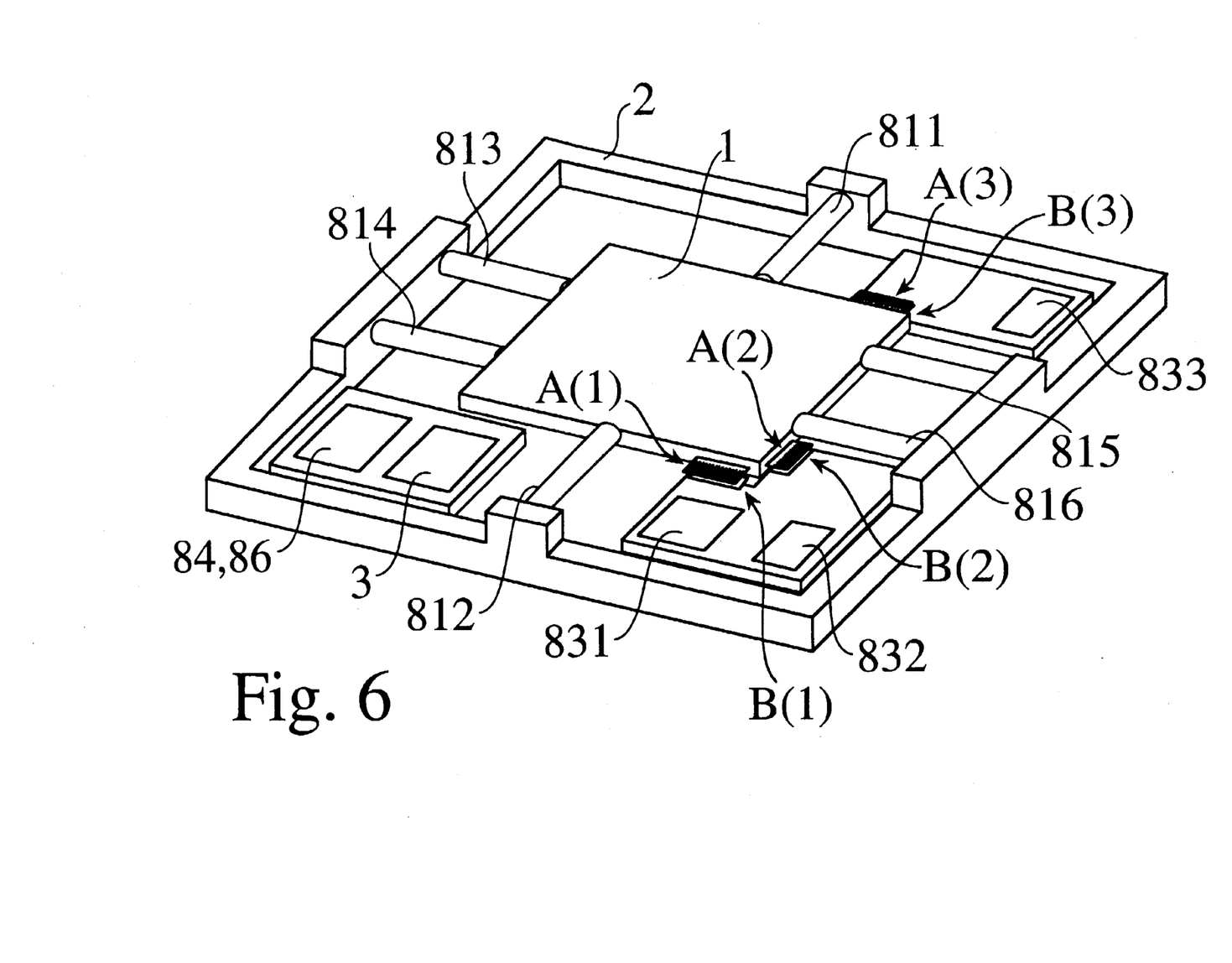
FIG. 6 shows an embodiment of the invention that provides a positioning device that controls two-dimensional displacement.

FIG. 6 shows a two-dimensional positioning device that can be fabricated on an integrated circuit. The first member 1 (the x-y stage in FIG. 6) is a square plate and positioned on the second member 2 (the substrate in FIG. 6). Actuators 811 and 812 are installed in the center of a first pair of opposite sides of the first member. Actuators 813 and 814, and 815 and 816 are installed with intervening spaces on the second pair of opposite sides of the first member. Each actuator also contacts the second member. By driving these actuators, the first member can be moved in two dimensions parallel to the surface of the second member without rotation.

The linear array A of first electrodes is divided into three arrays A(1) to A(3) of first electrodes, each of which is formed to project perpendicular to one of three sides of the first member 1. The linear array B of second electrodes is divided into three arrays B(1) to B(3) of second electrodes each of which is formed on the second member 2 opposite the respective one of the arrays A(1) to A(3).

The position detection circuits 831 to 833 are installed on the second member 2 to correspond to the arrays of first electrodes and of second electrodes. The position detection circuits are each formed to include a current measuring device and a null current electrode detector. A common signal source 3 is used for all three arrays of first electrodes. The two voltage signals from the signal source 3 whose phases differ by 180° are applied to alternate ones of the first electrodes in each of the arrays A(1) to A(3).

Each position detection circuit 831 to 833 outputs position information on the relative positions between the first member 1 and the second member 2. In this embodiment, if there is motion such as rotation of the x-y stage (i.e., when the displacements of opposite sides of the x-y stage differ), the amount and direction of the stage rotation can be determined from the position information from the array A(1) of first electrodes and the array B(1) of second electrodes, the array A(2) of first electrodes and the array B(2) of second electrodes, the array A(3) of first electrodes and the array B(3) of second electrodes. This is because the arrays of first electrodes and the corresponding arrays of second electrodes are provided on three of the sides of the first member 1. Therefore, similar to the embodiment of the invention shown in FIG. 5, in which rotation returns to its original state, if each actuator 811 to 816 is operated by the stage controller 84 and actuator controller 86, very accurate x-y stage positioning is possible.

In this embodiment, the pitches of the first electrodes and the second electrodes are the same as for the embodiment of the invention shown in FIG. 5. Although the arrays of first electrodes are installed to project from the sides of the first member, they can also be installed on the bottom or the top of the first member. An array of second electrodes is located on the second member at a position opposite each array of first electrodes.

The positioning device according to the invention can be used in a moving medium-type memory device according to the invention. In the moving medium-type memory device, multiple cantilever read/write probes are installed on a support substrate. A micro-needle is mounted on the tip of each probe. A read/write circuit is connected to each micro-needle. Each probe can be moved up and down by electrostatic force or piezoelectric force. A positioning device similar to that shown in FIG. 6, with the memory medium mounted on the first member 1, is mounted on the support substrate with the memory medium opposite the micro-needles of the probes. The second member is fixed relative to the support substrate. In this memory device, the positioning device according to the invention provides highly accurate positioning of the memory medium over a large range of movement.

Advantages provided by the invention include:

Relative displacement between the two members can be measured with high accuracy over a large range of movement. Detection of such displacement is not affected by changes in the spacing between the array of first electrodes and the array of second electrodes or changes in the area of overlap between the array of first electrodes and the array of second electrodes. Micromachining technology can be used to simplify fabrication. The invention is readily applied to various miniature moving medium-type memory devices.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

We claim:

1. A precision position detection device for detecting the position relationship between two members, said detection device comprising:

a linear array of first electrodes formed at equal pitches on one of said two members, said first electrodes being divided into a first electrode set composed of alternate ones of said first electrodes, and a second electrode set composed of alternate ones of said first electrodes not in said first electrode set;

a linear array of at least one second electrode formed on the other of said two members opposite said first electrodes and separated therefrom by a minute gap;

signal source means for applying a first alternating signal to said first electrode set and for applying a second alternating signal that differs in phase by 180° from said first alternating signal to said second electrode set; and current flow detecting means, connected to said at least one second electrode, for detecting a current flow in said at least one second electrode, wherein the magnitude of current detected by the current flow detecting means reaches a maximum when said linear array of at least one second electrode overlays one of said first electrodes, and falls to a minimum when said linear array of at least one second electrode is positioned such that one individual electrode in said linear array of at least one second electrode is located midway between adjacent ones of said first electrodes, and wherein the magnitude and direction of relative displacement between said two members from an initial position is determined by successively detecting when the position of one of said second electrodes in said linear array of at least one second electrode is such that the current detected by said current flow detecting means is minimal, wherein said two members have relative displacements in two dimensions without rotation.

2. The position detection device of claim 1, wherein at least two second electrodes are formed on said other of said two members.

3. The position detection device of claim 2, further comprising a null current electrode detector means for identifying one of said second electrodes in which no current flows.

4. The position detection device of claim 3, wherein said null current electrode detector means includes:

current to voltage conversion means, connected to each one of said second electrodes, for generating a voltage representing said current flowing in said one of said second electrodes; and means for detecting a difference between said voltages generated by said current to voltage conversion means.

5. The position detection device of claim 1, wherein plural second electrodes are formed on said other of said two members, said plural second electrodes being formed at equal pitches, said equal pitches of said second electrodes being different from said equal pitches of said first electrodes.

6. The position detection device of claim 1, wherein:

said array of first electrodes is divided into a first linear array of said first electrodes and a second linear array of said first electrodes;

said array of at least one second electrode is divided into a first linear array of plural second electrodes and a second linear array of plural second electrodes; and said first linear arrays are positioned at an angle to said second linear arrays so that relative displacements in different directions of said two members are detected.

7. The position detection device of claim 1, wherein:

said current flow detecting means generates a detection result; and said position detection device additionally comprises actuator means for receiving the detection result from said current flow detecting means, and for displacing said two members relative to each other in response thereto.

8. The position detection device of claim 7, wherein:

said position detection device additionally comprises:
a support substrate, and
a moving medium-type memory device installed on said support substrate, said moving medium-type memory device including:
a memory medium;
read/write probes having tips; and
micro-needle means, installed on the tips of the read/write probes, for reading and writing said memory medium;

said memory medium is attached to one of said two members and the other of said two members is fixed relative to said support substrate; and said actuator moves said memory medium.

9. A method for precision detection of a positional relationship between two members, the method comprising the steps of:

forming a linear array of plural first electrodes at equal pitches on one of said two members;

dividing said first electrodes into a first electrode set composed of alternate ones of said first electrodes and into a second electrode set composed of alternates ones of said first electrodes not in said first electrode set;

forming a linear array of at least one second electrode on the other of said two members;

positioning said first electrodes opposite said at least one second electrode and separated therefrom by a minute gap;

applying a first alternating signal to said first electrode set;

applying a second alternating signal that differs in phase by 180° from said first alternating signal to said second electrode set; and detecting a current flow in said at least one second electrode, wherein the magnitude of current detected by a current flow detecting means reaches a maximum when said linear array of at least one second electrode overlays one of said first electrodes, and falls to a minimum when said linear array of at least one second electrode is positioned such that one individual electrode in said linear array of at least one second electrode is located midway between adjacent ones of said first electrodes, and wherein the magnitude and direction of relative displacement between said two members from an initial position is determined by successively detecting when the position of one of said second electrodes in said linear array of at least one second electrode is such that the current detected by said current flow detecting means is minimal, wherein said two members have relative displacements in two dimensions without rotation.

10. The method of claim 9, additionally comprising steps of:

dividing said linear array of first electrodes into a first linear array of said first electrodes and a second linear array of said first electrodes;

dividing said linear array of at least one second electrode into a first linear array of plural second electrodes and a second linear array of plural second electrodes; and positioning said first linear arrays at an angle to said second linear arrays so that relative displacements of said two members in different directions are detected.

11. The method of claim 10, additionally comprising steps of:

providing a support substrate;

providing a moving medium-type memory device, including:

a memory medium mounted on one of said two members, read/write probes having tips, micro-needle means, installed at the tips of the read/write probes, for reading and writing said memory medium;

installing said moving medium-type memory device on said support substrate with the other of said two members stationary with respect to said support substrate; and moving said memory medium with said actuator.

12. The method of claim 9, wherein, in the step of forming a linear array of at least one second electrode, at least two second electrodes are formed on said other member.

13. The method of claim 12, additionally comprising a step of identifying one of said second electrodes in which no current flows.

14. The method of claim 13, additionally comprising steps of:

converting the current from each of said second electrodes into a voltage; and detecting a difference in voltage between said second electrodes to identify said one of said second electrodes in which no current flows.

15. The method of claim 9, wherein, in the step of forming a linear array of at least one second electrode, plural second electrodes are formed at equal pitches on said other member, said equal pitches of said second electrodes being different from said equal pitches of said first electrodes.

16. The method of claim 9, wherein:

the step of detecting current flow in said at least one second electrode generates a detection result; and the method additionally comprises steps of:

providing an actuator, receiving said detection result at said actuator, and operating said actuator in response to said detection result to displace said two members relative to each other.

* * * * *